No. 738,066. PATENTED SEPT. 1, 1903.
H. M. REICHENBACH.
STEREOSCOPIC CAMERA.
APPLICATION FILED DEC. 20, 1902.
NO MODEL. 2 SHEETS—SHEET 1.

Witnesses
Geo. H. Byrne
Stephen Hinsta

Inventor
H. M. Reichenbach
By Wilkinson & Fisher
Attorneys

No. 738,066. PATENTED SEPT. 1, 1903.
H. M. REICHENBACH.
STEREOSCOPIC CAMERA.
APPLICATION FILED DEC. 20, 1902.
NO MODEL. 2 SHEETS—SHEET 2.

Witnesses.
Geo. H. Pepue.
Stephen Kinsta.

Inventor
H. M. Reichenbach
By Wilkinson & Fisher
Attorney

No. 738,066.

Patented September 1, 1903.

UNITED STATES PATENT OFFICE.

HENRY M. REICHENBACH, OF NEW YORK, N. Y.

STEREOSCOPIC CAMERA.

SPECIFICATION forming part of Letters Patent No. 738,066, dated September 1, 1903.

Application filed December 20, 1902. Serial No. 136,049. (No model.)

*To all whom it may concern:*

Be it known that I, HENRY M. REICHENBACH, a citizen of the United States, residing at New York city, State of New York, have invented certain new and useful Improvements in Stereoscopic Cameras; and I do hereby declare the following to be a full, clear, and exact description of the invention, such as will enable others skilled in the art to which it appertains to make and use the same.

My invention relates to improvements in box-cameras, and especially to cameras provided with two compartments for stereoscopic work, and is manufactured in three styles, which may be designated as "focusing," "non-focusing," and "reflecting finder or view-composer."

Among the many advantages of my invention (besides that the camera is constructed entirely of press-board or its equivalent except the operating parts, which enables me to produce a simple but durable stereoscopic camera at a small cost) are that the camera permits of, in addition to stereoscopic work, the using of a single compartment as a finder, the making of single pictures on the plate when desired, and in the reflecting type the arrangement allows of one lens being used to compose the view and project it on the ground-glass plate located on top of the camera, the reflector being swung out of the path of light previous to making the exposure.

My invention has other advantages and features of novelty, which will more fully appear in the specification and claims.

Figure 1:
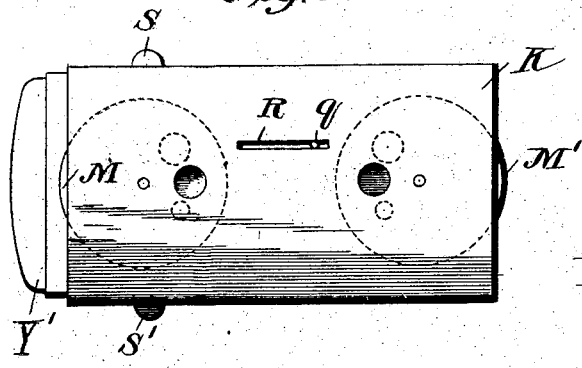
Figure 2:
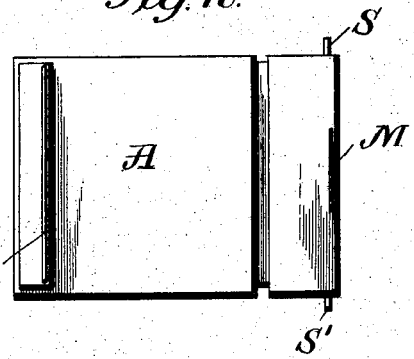
Figure 4:
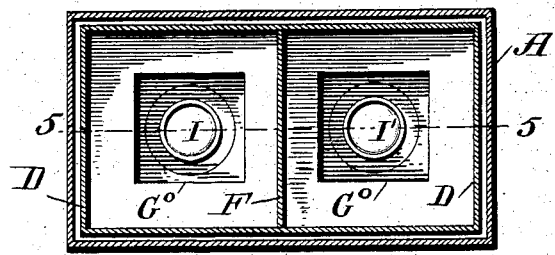
Figure 3:
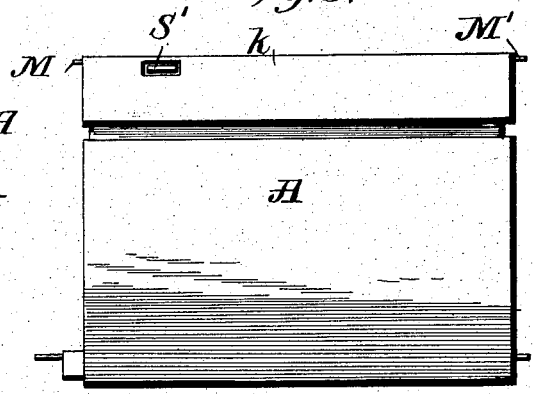
Figure 5:
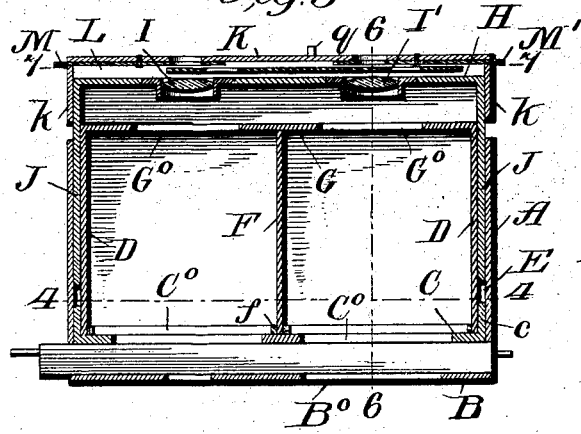
Figure 6:
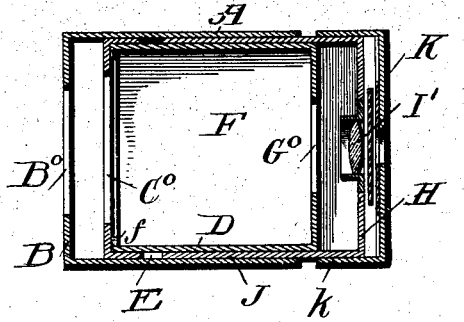
Figure 7:
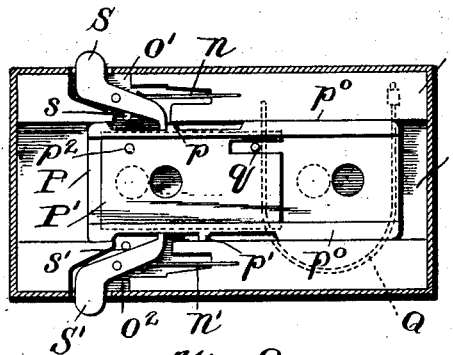
Figure 8:
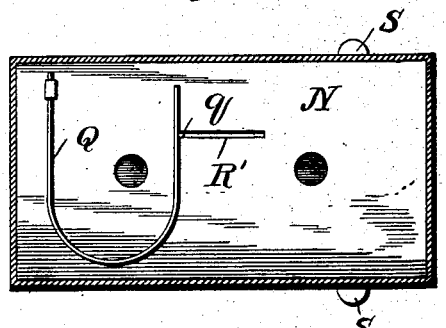
Figure 9:
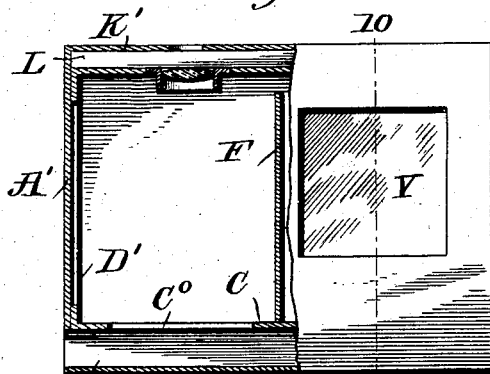
Figure 10:
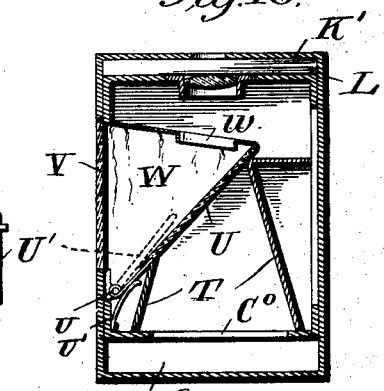
Figure 11:
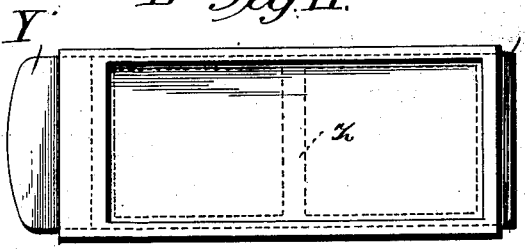
Figure 13:
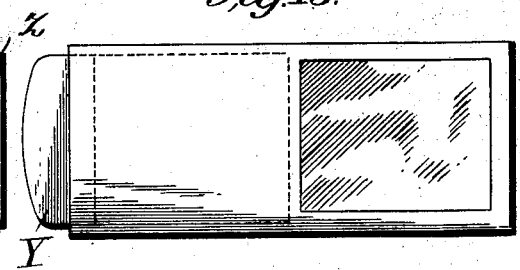
Figures 12, 14:
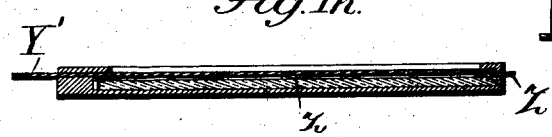

Referring now to the accompanying drawings, illustrating the same, and in which like letters refer to corresponding parts in the several views, Figure 1 is a front elevation; Fig. 2, a side elevation of the focusing type of camera; Fig. 3, a plan view of same; Fig. 4, a vertical section on line 4 4 of Fig. 5; Fig. 5, a horizontal section on line 5 5 of Fig. 4, the plate-holder being shown in elevation and the shutter represented diagrammatically; Fig. 6, a vertical section on line 6 6 of Fig. 5, the plate-holder being omitted; Fig. 7, a vertical longitudinal section through the shutter-casing substantially on the line 7 7 of Fig. 6, the front shutter-plate being omitted, showing the shutter mechanism in elevation; Fig. 8, a similar section through the casing to the rear of the shutter, showing the rear shutter-plate and operating-spring; Fig. 9, a partial plan and central horizontal section through the non-focusing type of camera, the right-hand compartment of which is provided with a reflecting finder device; Fig. 10, a vertical section on line 10 10 of Fig. 9; Fig. 11, a top plan view of plate-holder, showing combined plate-retaining slide and mask in dotted lines; Fig. 12, a longitudinal vertical section through same; Fig. 13, a bottom plan view of a modified form of plate-holder, and Fig. 14 a vertical longitudinal section through same.

The camera-body proper is made of any suitable light material, such as press-board or its equivalent, the lens-holders and operating parts only being of metal.

In the focusing type the main casing, formed from the side walls A and rear wall B, is open at its forward end and provided at its rear end with suitable means for retaining the plate-holder in position. A second casing is located inside of the main casing and is suitably held in position therein by the rear wall C, which laps over the side walls D, as at $c$, and the inner and outer faces of the lapped-over ends $c$ are glued to the walls D and A of the two casings, respectively. These lapped-over ends $c$, it will also be observed, serve as shoulders or spacing means for separating the two casings and forming therebetween the spaced guideway or passage E. The inner casing is divided off into two compartments by the partition F, extending transversely from the front wall G to the rear wall C, and this partition is held rigidly in position in any suitable manner—for instance, as shown, at one end—by the reinforcing-strip $f$ of felt, which also serves as a light-lock. The front and rear walls of the inner casing are provided with suitable openings $G^\circ$ $C^\circ$, as is also the rear wall of the main casing, as at $B^\circ$. The focusing member comprises the front wall H, in which are mounted the two lenses I I' and the side walls J, adapted to slide in the guiding-passage E. A cap or cover K surrounds the forward end of the focusing member and is held thereon by the lapping sides $k$, glued to the walls J. This cap or cover K is spaced from the focusing member, forming a chamber L therebetween for the reception of a suitable shutter mechanism and the stops M M'.

Any suitable shutter may be used, if desired; but in combination with my stereoscopic camera I prefer to use the shutter mechanism illustrated in Figs. 7 and 8. In this construction N represents a back or supporting plate, formed of press-board or its equivalent, provided on its front surface with the grooves or cut-away portion O, in which is operated the shutter-slide P, when set and released by the spring Q in engagement with the rear end of the pin $q$, passing through the slide P and through alined slots R and R' in the cover or cap K and the plate N, respectively. The upper and lower side edges of the shutter-plate P are cut away, as shown, and are provided with the lugs or pins $p$ $p'$, adapted to engage the spring-operated releasing-levers S S', which operate independently for time-exposures and conjointly for instantaneous work. The front surface of the back or supporting plate N of the shutter is also cut away, as shown at $O'$ $O^2$, for the reception of the releasing-levers S S'. The pivoted levers S S' are preferably of the form clearly shown in the drawings and their inward movements under the tension of the springs $n$ $n'$ are limited by the stops or pins $s$ $s'$. The front of the shutter is generally provided with a suitable retaining-plate, (not shown,) which is adapted to be glued to the front face of the plate N and cover the operating mechanism shown in Fig. 7. Through the cover or cap K the retaining-plate (not shown) and the supporting base-plate N are suitable exposure-apertures arranged and adapted at all times to be in alinement with the lenses, and exposure-apertures are also provided through the shutter-plate P, adapted to aline with the aforesaid apertures when the shutter is open, but out of alinement therewith when the shutter is set ready for exposure and after the exposure has been made. When it is desired to take a single picture, either one of the circular stops M M' may be rotated until the solid portion of the stop closes the lens opposite the same, but in the particular construction of shutter shown the same end may be accomplished. For this purpose the side edges of the plate P are bent over to form the guiding channels or grooves $p°$ to receive and retain the sliding auxiliary plate P'. (Shown in its open position to the left of Fig. 7.) This plate, as shown, is only adapted to operate to close the right-hand lens, but obviously may be lengthened to operate in front of both lenses and is provided with suitable apertures adapted to be brought into or out of alinement with the openings in the main plate P, opposite the lenses, and by means of this auxiliary plate either of the lenses may be opened after the shutter is set for composing the view through one of the compartments or it may be kept closed when the shutter is released, and thus but one side of the plate exposed. The auxiliary plate may be operated by any suitable means—such, for instance, as the projecting pin $p^2$, passing through a suitable slot in the front of the camera-casing.

In the non-focusing type of camera the construction of the inner and outer casings is substantially the same as the focusing type, the focusing member being dispensed with. However, the forward end of the main casing is closed by the front wall K', corresponding to all purposes with the cap K. In this construction also the side walls D' of the inner casing are glued directly to the corresponding walls A' of the main casing, and the lenses are mounted in the front walls G' instead of in the focusing member of the focusing type of camera, all as clearly shown in Figs. 9 and 10.

In Figs. 9 and 10 I have also illustrated a reflecting finder mechanism located in one of the compartments of the inner casing, and although I have shown this modification as applied to the non-focusing type, it will be observed that it might readily be applied to the focusing type of camera also. In this construction T represents a hollow cone suitably supported in the right-hand compartment of the inner casing, having a portion of its surface cut away, as clearly shown in Fig. 10, to form a rest or support for the mirror U, pivoted on the rod $u$ to the side walls of the casings adjacent the top rear end thereof. This mirror is operated against the tension of the spring $u'$ by the lever or crank U' and is adapted to normally rest beneath the ground-glass plate V in the top of the camera to exclude the light, which would otherwise be projected therethrough, from the interior of the compartment when the plate is uncovered ready for exposure. This mirror U is also connected to the inner casing in front of and on the sides of the ground-glass plate V by the hood or cover W, of any suitable flexible light-excluding material, such as black cloth, which is provided with an aperture $w$, adapted to aline with the lenses when the mirror is in its reflecting position, which allows the image to be projected on the mirror and thence to the ground glass for composing the view, but which is folded in between the mirror and the ground-glass plate when the mirror is in its normal closed position. In the other forms the ground-glass plate is located to the rear of the camera, as in the ordinary type of camera, and may be secured in the opening B°, (shown in Fig. 5;) but in some instances, where it is only desirable to take a single picture at a time, I prefer to use the specially-formed plate-holder shown in Figs. 13 and 14, wherein the plate-holder comprises two compartments formed by the transverse wall $x$, the ground-glass plate forming the rear wall of one compartment, as shown at V', while the other compartment is adapted to receive a plate one-half of the normal size, covered, as shown, by the one-half slide Y.

In the plate-holder shown in Figs. 11 and 12, generally used in connection with my stereoscopic camera when a double picture is to be taken, I have shown the plate as retained in position in the plate-holder by means of the brass slide Z, adapted to be covered by the slide Y'. This brass slide Z is in the form of a rectangular frame provided with the central transverse cross-piece $z$, and in addition to forming a means for retaining the plate in position in the plate-holders serves the further purpose of a mat for separating the two pictures on the plate. This slide Z is preferably inserted into the plate-holder in a direction the reverse of the insertion of the slide Y', and the outer end thereof may project through a suitable slot provided in the camera-casing; but it is manifest that the slides Z and Y' may be inserted into the plate-holder from the same end.

Many modifications might be made without departing from the spirit of my invention. For instance, although I have shown a channel or chamber $B^2$ in the rear of the camera for the insertion of the plate-holder, it is manifest, as before stated, that any other suitable well-known means might be used for this purpose; also, the chamber or channel $B^2$ might be left open at both ends, and when taking single pictures instead of using the form of plate-holder shown in Figs. 13 and 14 the plate-holder and ground-glass holder may be in two separate parts inserted in the chamber $B^2$ from opposite sides.

Having thus described my invention, what I claim, and desire to secure by Letters Patent of the United States, is—

1. In a stereoscopic camera, the combination with the inner and outer casings provided with suitable lenses and exposure-apertures, a central transverse partition dividing said inner casing into two exposure-compartments, and suitable shutter mechanism.

2. In a stereoscopic camera, the combination with the inner and outer casings provided with suitable lenses and exposure-apertures, a central transverse partition dividing said inner casing into two exposure-compartments, a transverse chamber disposed in front of said lenses, and suitable shutter mechanism operating in said transverse chamber.

3. In a stereoscopic camera, the combination with the inner and outer casings provided with suitable lenses and exposure-apertures, a central transverse partition dividing said inner casing into two exposure-compartments, a transverse chamber formed between the rear walls of said casings for receiving a plate-holder, a transverse chamber disposed in front of said lenses, and suitable shutter mechanism operating in said forward transverse chamber.

4. In a stereoscopic camera, the combination with an outer casing provided with an aperture in its rear wall, of an inner casing provided with apertures in its front and rear walls so located in said outer casing as to form a chamber between the rear walls of said casings for receiving the plate-holder, a rigid transverse partition dividing said inner casing into two exposure-compartments, lenses opposite said compartments in front thereof, a chamber formed in front of said lenses, and suitable shutter mechanism operating in said forward chamber.

5. In a stereoscopic camera, the combination with the inner and outer casings provided with suitable lenses and exposure-apertures, a rigid transverse partition dividing said inner casing into two exposure-compartments, suitable shutter mechanism, and means coöperating with said shutter mechanism for finding and composing the picture to be taken through one of said exposure-compartments.

6. In a stereoscopic camera, the combination with the inner and outer casings provided with suitable lenses and exposure-apertures, a rigid transverse partition dividing said inner casing into two exposure-compartments, suitable shutter mechanism, and means coöperating with said shutter mechanism after the shutter has been set for finding and composing the picture to be taken through one of said exposure-compartments.

7. In a stereoscopic camera, the combination with the inner and outer casings provided with suitable lenses and exposure-apertures, a rigid transverse partition dividing said inner casing into two exposure-compartments, suitable shutter mechanism, and means coöperating with said shutter mechanism for finding and composing the picture to be taken through one of said exposure-compartments, comprising a ground-glass plate located in proximity to said compartment.

8. In a stereoscopic camera, the combination with the inner and outer casings provided with suitable lenses and exposure-apertures, a rigid transverse partition dividing said inner casing into two exposure-compartments, a transverse chamber disposed in front of said lenses, suitable shutter mechanism operating in said transverse chamber, and means coöperating with said shutter mechanism for finding and composing the picture to be taken through one of said exposure-compartments.

9. In a stereoscopic camera, the combination with the inner and outer casings provided with suitable lenses and exposure-apertures, a rigid transverse partition dividing said inner casing into two exposure-compartments, a transverse chamber formed between the rear walls of said casings, a transverse chamber formed and disposed in front of said lenses, suitable shutter mechanism operating in said forward transverse chamber, and means coöperating with said shutter mechanism for finding and composing the view to be taken through one of said exposure-compartments, comprising a ground-glass plate located in proximity to said compartment.

10. In a stereoscopic camera, the combination with a suitable casing divided off into two compartments, a focusing member slidingly mounted relative to said casing, lenses carried by said focusing member opposite the exposure-apertures in said casing, and suitable shutter mechanism.

11. In a stereoscopic camera, the combination with a suitable casing divided off into two compartments with suitable exposure-apertures therein, of a focusing member slidably mounted relative to said casing, lenses carried by said focusing member opposite said exposure-apertures, a transverse chamber formed in said focusing member in front of said lenses, and suitable shutter mechanism operating in said transverse chamber.

12. In a stereoscopic camera, the combination with the spaced inner and outer casings with suitable apertures therethrough, of a rigid transverse partition dividing said inner casing into two compartments, a focusing member slidably mounted between said spaced casings, lenses carried by said focusing member opposite said exposure-apertures, and suitable shutter mechanism.

13. In a stereoscopic camera, the combination with a suitable casing divided off into two exposure-compartments, a focusing member slidably mounted relative to said casing, suitable exposure-apertures in said casing, lenses carried by said focusing member opposite said exposure-apertures, suitable shutter mechanism, and means coöperating therewith for finding and composing the view to be taken through one of said exposure-compartments, comprising a ground-glass plate located in proximity to said compartment.

14. In a stereoscopic camera, the combination with the spaced inner and outer casings with suitable exposure-apertures therethrough, of a transverse partition dividing said inner casing into two exposure-compartments, a focusing member slidably mounted between said spaced casings, lenses carried by said focusing member opposite said exposure-apertures, suitable shutter mechanism carried by said focusing member, and means coöperating therewith for finding and composing the view to be taken through one of said exposure-compartments, comprising a ground-glass plate located in proximity to said compartment.

15. In a stereoscopic camera, the combination with a suitable casing provided with two compartments and lenses therefor, of suitable shutter mechanism, means coöperating therewith for finding and composing the view to be taken through one of said compartments, comprising a ground-glass plate and a pivoted mirror in said compartment in proximity to said plate, and means for operating said mirror in and out of the path of light.

16. In a stereoscopic camera, the combination with a suitable casing provided with two compartments and lenses therefor, of suitable shutter mechanism, means coöperating therewith for finding and composing the view to be taken through one of said compartments, comprising a ground-glass plate and a pivoted mirror in said compartment in proximity to said ground-glass plate, a flexible hood, provided with an aperture through the same at the outer end thereof attached to said mirror and inclosing the space between the same and said ground-glass plate, and means for operating said mirror in and out of the path of light.

In testimony whereof I affix my signature in presence of two witnesses.

HENRY M. REICHENBACH.

Witnesses:
JOHN J. STAHL,
CHAS. E. STAHL.